(12) United States Patent
Jang et al.

(10) Patent No.: US 8,156,084 B2
(45) Date of Patent: Apr. 10, 2012

(54) TRANSFER OF DATA FROM POSITIONAL DATA SOURCES TO PARTITIONED DATABASES IN RESTARTABLE ENVIRONMENTS

(75) Inventors: Jing-Song Jang, Cupertino, CA (US); James Michael McArdle, Austin, TX (US); Michael John Elvery Spicer, Lafayette, CA (US)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 12/016,039

(22) Filed: Jan. 17, 2008

(65) Prior Publication Data

US 2009/0187787 A1    Jul. 23, 2009

(51) Int. Cl.
*G06F 7/00* (2006.01)
*G06F 17/00* (2006.01)

(52) U.S. Cl. .......... 707/684; 707/683; 707/802; 714/16; 714/19

(58) Field of Classification Search ................... None
See application file for complete search history.

(56) References Cited

U.S. PATENT DOCUMENTS

| | | | |
|---|---|---|---|
| 5,960,194 A * | 9/1999 | Choy et al. .......................... 1/1 |
| 6,240,442 B1 * | 5/2001 | Domenikos et al. .......... 709/203 |
| 6,289,474 B1 * | 9/2001 | Beckerle ........................ 714/37 |
| 6,473,774 B1 * | 10/2002 | Cellis et al. .......................... 1/1 |
| 6,480,941 B1 | 11/2002 | Franke et al. |
| 6,571,282 B1 | 5/2003 | Bowman-Amuah |
| 6,662,307 B1 | 12/2003 | Sipple et al. |
| 6,681,348 B1 | 1/2004 | Vachon |
| 6,845,384 B2 | 1/2005 | Bamford et al. |
| 6,895,487 B2 * | 5/2005 | Thusoo et al. ................ 711/173 |
| 6,898,608 B2 | 5/2005 | Hopeman et al. |
| 7,028,056 B1 | 4/2006 | Hendel et al. |
| 7,149,929 B2 | 12/2006 | Chaurasia |
| 7,237,139 B2 | 6/2007 | Hamilton, II et al. |
| 7,490,268 B2 | 2/2009 | Keromytis et al. |
| 7,577,667 B2 * | 8/2009 | Hinshaw et al. ...................... 1/1 |
| 7,653,665 B1 | 1/2010 | Stefani et al. |
| 7,689,565 B1 * | 3/2010 | Gandhi et al. ........... 707/999.01 |
| 7,730,489 B1 * | 6/2010 | Duvur et al. ................... 718/104 |
| 7,779,404 B2 * | 8/2010 | Movassaghi et al. ......... 717/171 |
| 7,933,873 B2 | 4/2011 | Jang et al. |
| 2002/0049815 A1 | 4/2002 | Dattatri |
| 2002/0161778 A1 | 10/2002 | Linstedt |
| 2003/0084142 A1 | 5/2003 | Casati et al. |
| 2003/0115207 A1 | 6/2003 | Bowman et al. |
| 2004/0243618 A1 * | 12/2004 | Malaney et al. .............. 707/102 |
| 2004/0267835 A1 | 12/2004 | Zwilling et al. |
| 2004/0268244 A1 * | 12/2004 | Levanoni et al. ............. 715/514 |
| 2006/0010180 A1 | 1/2006 | Kawamura et al. |
| 2006/0123204 A1 | 6/2006 | Brown et al. |
| 2006/0136354 A1 | 6/2006 | Bell et al. |
| 2007/0011167 A1 * | 1/2007 | Krishnaprasad et al. ......... 707/9 |
| 2007/0033281 A1 | 2/2007 | Hwang et al. |
| 2008/0091714 A1 * | 4/2008 | Idicula et al. ............. 707/103 R |

* cited by examiner

*Primary Examiner* — Khanh Pham
*Assistant Examiner* — Azam Cheema
(74) *Attorney, Agent, or Firm* — Patterson & Sheridan, LLP

(57) ABSTRACT

Method, computer program product, and system for transferring data from positional data sources to partitioned databases are provided. A record is read from a positional data source. The record is to be written to one of a plurality of partitions of a database. A position of the record in the positional data source is obtained. A transaction is initiated to write the record to the one partition and to store the position of the record in the database. The transaction is committed after the record is successfully written to the one partition and the position of the record is successfully stored in the database.

19 Claims, 4 Drawing Sheets

TRANSFER OF DATA FROM POSITIONAL DATA SOURCES TO PARTITIONED DATABASES IN RESTARTABLE ENVIRONMENTS

CROSS-REFERENCE TO RELATED APPLICATIONS

The present application is related to co-pending U.S. patent application Ser. No. 12/015,836, entitled "Handling Transfer Of Bad Data To Database Partitions In Restartable Environments" and co-pending U.S. patent application Ser. No. 12/016,092, entitled "Transfer Of Data From Transactional Data Sources To Partitioned Database In Restartable Environments", both of which are filed on even day herewith and co-assigned to the assignee of the present application.

BACKGROUND

Large volumes of data are sometimes transferred from positional data sources to partitioned databases. If data is being transferred in a restartable environment, then positioning information will need to be preserved. Specifically, information as to which positions in a positional data source have been processed and which positions in the positional data source have not been processed will be needed whenever a restart occurs after a failure in order to avoid transferring any data already transferred and skipping any data not yet transferred.

SUMMARY

Method, computer program product, and system for transferring data from positional data sources to partitioned databases are provided. In one implementation, a record is read from a positional data source. The record is to be written to one of a plurality of partitions of a database. A position of the record in the positional data source is obtained. A transaction is initiated to write the record to the one partition and to store the position of the record in the database. The transaction is committed after the record is successfully written to the one partition and the position of the record is successfully stored in the database.

DETAILED DESCRIPTION

This disclosure generally relates to transferring data from positional data sources to partitioned databases in restartable environments. The following description is provided in the context of a patent application and its requirements. Accordingly, this disclosure is not intended to be limited to the implementations shown, but is to be accorded the widest scope consistent with the principles and features described herein.

When transferring data from a positional data source (e.g., a file, a database table, or the like) to a partitioned database (e.g., a database divided into parts) in a restartable environment (e.g., capable of automatically restarting after failure occurs), positional information (e.g., information relating to which positions in the positional data source have been processed) must be preserved in order to ensure that no data will be lost or duplicated upon a restart after a failure occurs (e.g., network connection being cut off, system crashing, application error, or the like).

Figure 1:
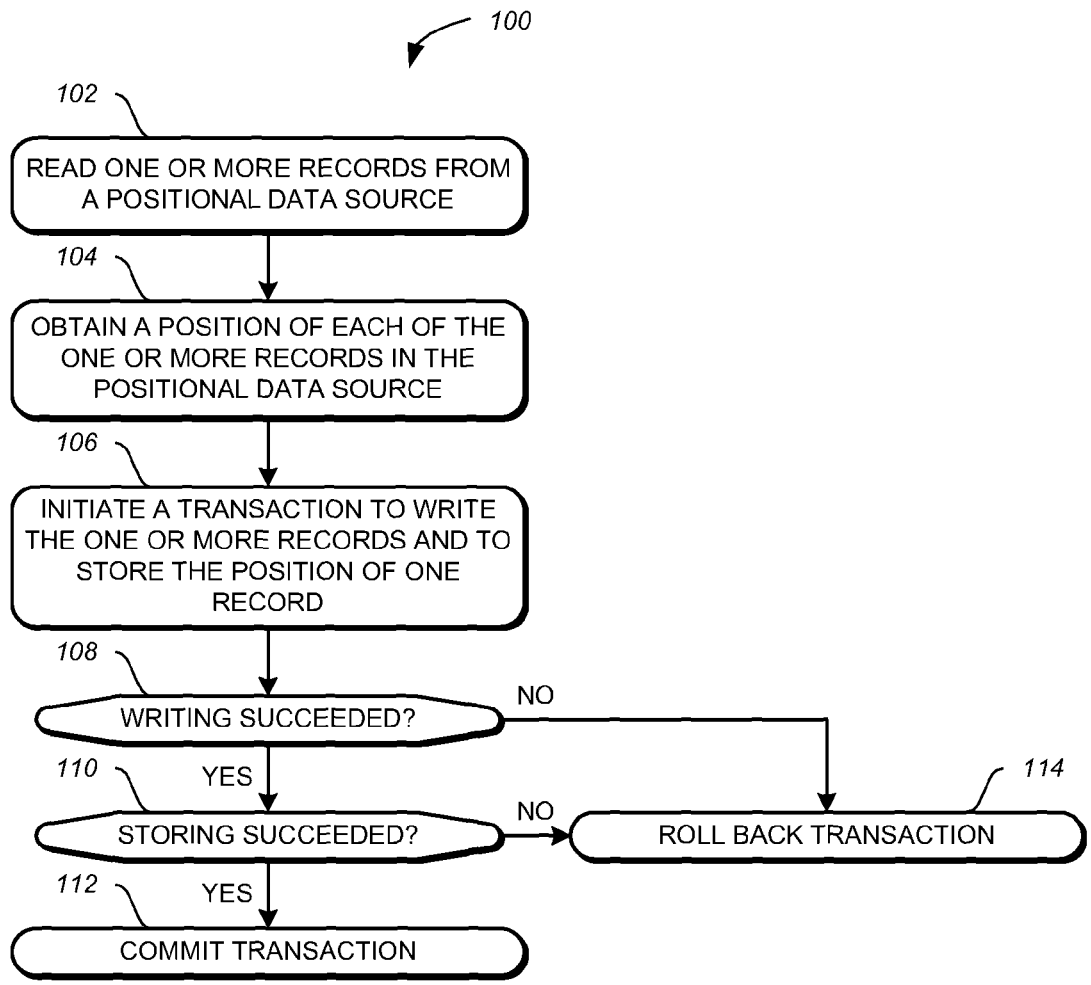
FIG. 1 depicts a process for transferring data from positional data sources to partitioned databases according to an implementation.

Depicted in FIG. 1 is a process for transferring data from positional data sources to partitioned databases according to an implementation. At 102, one or more records are read from a positional data source. The one or more records are to be written to one of a plurality of partitions of a database. The one or more records need not be read from the positional data source at the same time. For example, records in the positional data source could be read one at a time. Records could also be read in groups, but the one or more records are not necessarily read from the positional data source in the same group.

A position of each of the one or more records in the positional data source is obtained at 104. The position of each of the one or more records may be obtained at the same time the record is read from the positional data source. In one implementation the position of each record is an offset (e.g., a number) from a starting position of the positional data source. For example, if the starting position of a positional data source is 0, then a third record in the positional data source is at position 2.

At 106, a transaction is initiated to write the one or more records to the one partition and to store the position of one of the one or more records in the database. In one implementation, the position of the one record is farthest from a starting position of the positional data source among the one or more records written to the one partition. For example, if a starting position of a positional data source is 0 and records at positions 5, 8, and 9 of the positional data source are being written to a partition of a database, then position 9 would be stored in the database. The records need not be written to the partition in any particular order.

In another implementation, the one or more records are written to the one partition in positional order and the one record is a last of the one or more records written to the one partition. For example, if the positional order of a positional data source is A, B, C, and so forth and records at positions E, B, D are to be written to a partition of a database, then position E would be stored in the database because the record at position E will be the last record written to the partition. The position of the one record may be stored in the one partition or in another partition of the database.

A determination is made at 108 as to whether the one or more records have been successfully written to the one partition. If the answer is yes, then a determination is made at 110 as to whether the position of the one record has been successfully stored in the database. If the answer is also yes, then the transaction is committed (e.g., written to hard disk from memory) at 112. However, if the answer is no to either 108 or 110, then the transaction is rolled back at 114.

By storing the position of a record written to a partition of a database and combining the writing of the record and the storing of the position into a single transaction, positional information that will be needed to recover from data transfer failure is preserved. Specifically, if data transfer fails after storing of the position succeeded, but before writing of the record succeeded, or vice versa, then there is no risk of data loss or data duplication when data transfer restarts because the operation that succeed before failure occurred will be rolled back.

Figure 2:
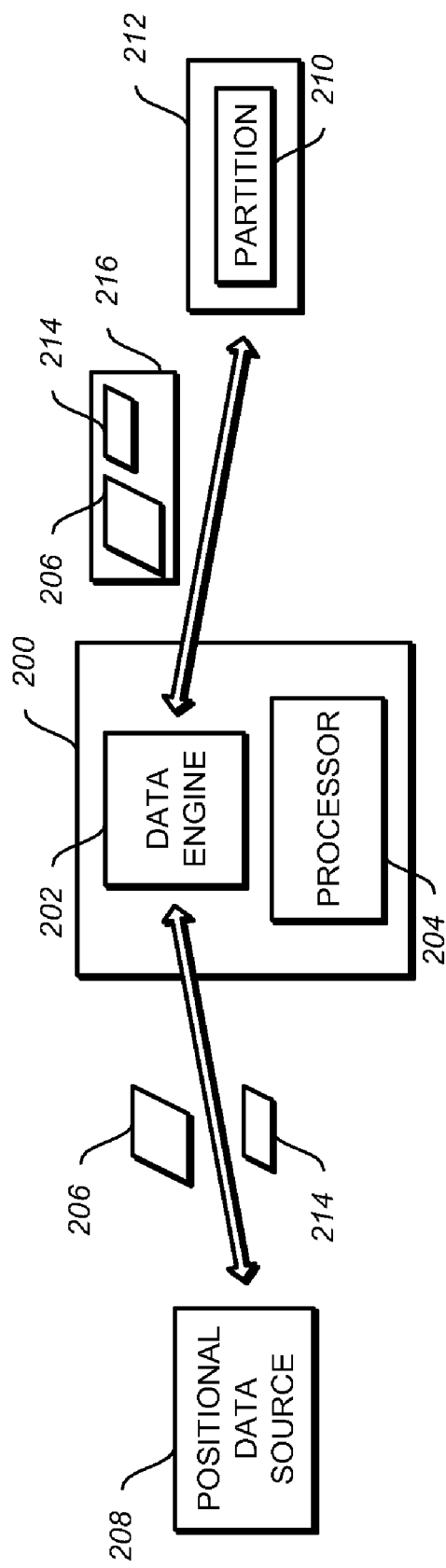
FIGS. 2-3 illustrate systems for transferring data from positional data sources to partitioned databases according to various implementations.

FIG. 2 illustrates a system 200 for transferring data from positional data sources to partitioned databases according to an implementation. System 200 includes a data engine 202 executing on a processor 204. Other components (not illustrated) may be included in system 200. For example, system 200 may include memory, hard disk, or the like.

Data engine 202 reads a record 206 from a positional data source 208. In one implementation, positional data source 208 is a file. Positional data source 208 may be remotely located from system 200. Record 206 is to be written to partition 210 of database 212. Database 212 includes one or more other partitions (not illustrated). Data engine 202 also obtains a position 214 of record 206 in positional data source 208. Position 214 of record 206 can be obtained when data engine 202 reads record 206 from positional data source 208 as data engine 202 will know from which position in positional data source 208 record 206 is being read.

A transaction 216 is then initiated by data engine 202 to write record 206 into partition 210 and to store position 214 of record 206 in database 212. Position 214 of record 206 may be stored in partition 210 or another partition (not illustrated) of database 212. Since the writing of record 206 and the storing of position 214 are part of the same transaction 216, data engine 202 will only commit transaction 216 if both operations are successful. If either of the operations fails, then transaction 216 will be rolled back by data engine 202.

Figure 3:
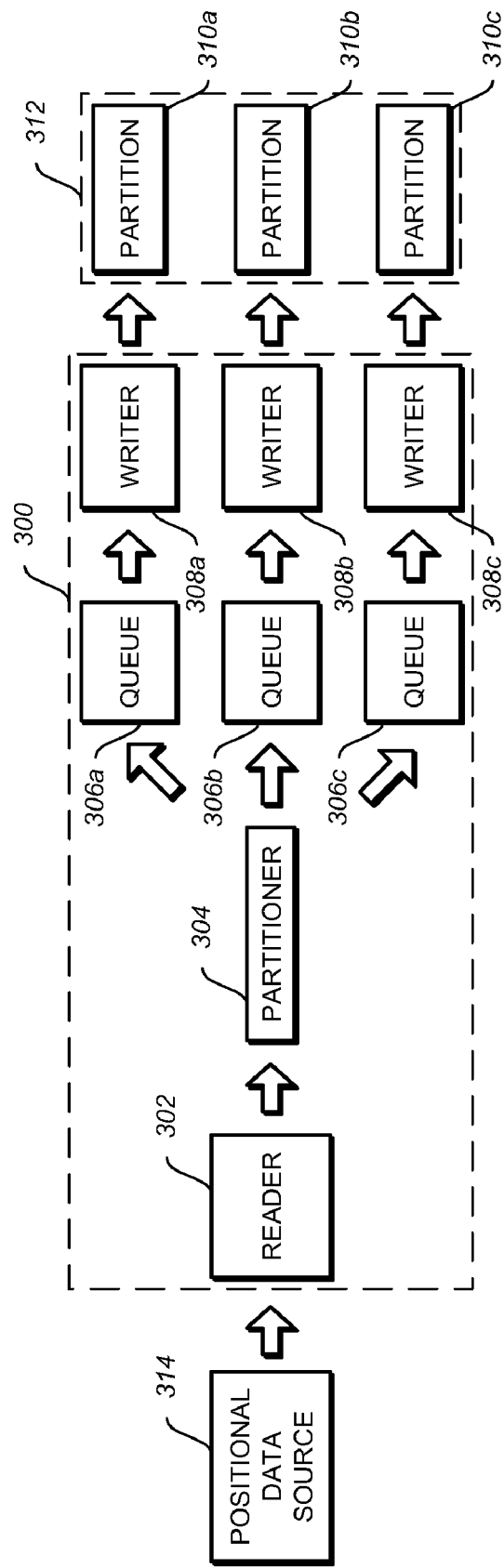

Shown in FIG. 3 is a system 300 for transferring data from positional data sources to partitioned databases according to an implementation. System 300 includes a reader 302, a partitioner 304, a plurality of queues 306, and a plurality of writers 308. Each queue 306 is assigned to one writer 308. Each writer 308 is servicing one of a plurality of partitions 310 of a database 312.

Although database 312 is shown with 3 partitions 310, database 312 may include less or more partitions (not shown). Each partition 310 of database 312 is serviced by at least one writer 308. Hence, if database 312 included additional partitions (not shown), then system 300 will include additional writers (not shown). Although each partition 310 is shown as being serviced by only one writer 308, each partition 310 may be serviced by more than one writer.

In FIG. 3, reader 302 reads records saved in a positional data source 314. Reader 302 may read the records one at a time or in groups of two or more records. For each record read, reader 302 also obtains a position of the record in positional data source 314. The position of a record may be, for instance, an offset from a beginning of positional data source 314. Reader 302 may obtain the position of each record read when reading the record from positional data source 314.

Records read by reader 302 are then forwarded to partitioner 304 to determine to which partition 310 each record is to be written. Partitioner 304 then places each record and its position in the queue 306 assigned to the writer 308 servicing the partition 310 to which the record is to be written. Any of the writers 308 that have at least one record placed in the queue 306 assigned to the writer 308 can initiate a transaction to write one or more records in the queue 306 to the partition 310 serviced by the writer 308 and to store the position of one of the one or more records written to the partition 310 in database 312. The number of records written to the partition 310 need not be all of the records that are in the queue 306 at the time the transaction is initiated.

In one implementation, the position of the one record that is stored in database 312 is the record with a position farthest from a starting position of positional data source 314 among the one or more records written to the partition 310. Depending on how the one or more records are written to the partition 310, the one record may be the last of the one or more records written to the partition 310 if the one or more records are written to the partition 310 in positional order.

The position of the one record may be stored in a table (not shown), which could be saved in the partition 310 or another partition of database 312. The table may be created at any time prior to starting data transfer from positional data source 314. Below is sample pseudo-code for creating a table to store positional information.

---

CREATE TABLE POSITION_INFO (
    READER_ID       INTEGER NOT NULL,
    STORE_ID        INTEGER NOT NULL,
    WRITER_ID      INTEGER NOT NULL,
    DATA_SOURCE    VARCHAR(1024),
    MESSAGE_ID     INTEGER NOT NULL,
    PRIMARY KEY    (READER_ID, STORE_ID, WRITER_ID)
);

---

The table may have an entry for each writer 308 in system 300 to keep track of how far into positional data source 314 each writer 308 has gotten. For example, if writer 308a has processed records at positions 2, and 8, writer 308b has processed a record at position 1, and writer 308c has processed records at positions 4 and 5, then the table entry for writer 308a will be 8, the table entry for writer 308b will be 1, and the table entry for writer 308c will be 5.

Writer 308 will only commit the transaction if both the writing of the one or more records and the storing of the position of the one record succeed. If either one fails, then writer 308 will roll back the transaction. Hence, any record position stored will be deleted and any record written will be deleted if either operation fails. Failure may result from, for instance, loss of a network connection, a system crash, an application error, or the like.

At any given time, multiple transactions may be active (e.g., uncommitted). Therefore, if system 300 were to crash, then all transactions active when system 300 crashed would be rolled back upon restarting system 300. In addition, a table storing the positional information for each writer 308 can be referenced to determine where to re-start reading from positional data source 314. Specifically, the table will show where each writer 308 left off (e.g., the position of the last record successfully committed to the database partition). Thus, the position from which reader 302 restarts reading can be based on the position in the table that is closest to the starting position of positional data source 314.

To given an example, suppose the example set forth above still holds (i.e., the table entry for writer 308a is 8, the table entry for writer 308b is 1, and the table entry for writer 308c is 5). Upon a restart, reader 302 can start reading the record at position 2 of positional data source 314 as position 1 has already been successfully processed by writer 308b. Reader 302 cannot restart reading from positional data source 314 at position 6 or position 9 because there are records in earlier positions that have not been processed.

Since reader 302 is restarting from position 2, records that have already been successfully processed will be re-read from positional data source 314. However, each writer 308 can check the positional information stored in the table to reject any record that have already been successfully written to database 312 in order to avoid duplicating data. Based on the example above, writer 308a will reject any record at a position that is less than or equal to 8, writer 308b will reject any record at a position that is less than or equal to 1, and writer 308c will reject any record at a position that is less than or equal to 5.

If more than one writer 308 is servicing one of the partitions 310 of database 312, then partitioner 304 will need to make sure that the same record is sent to the same queue 306 each time the record is processed in order to prevent different writers 308 from processing the same record. In the example above, suppose there is a fourth writer (not shown) servicing partition 310b and the record at position 3 of positional data source 314 was successfully written into partition 310b by that fourth writer. Upon a restart, the record at position 3 cannot be placed in queue 306b assigned to writer 308b because writer 308b will write that record into partition 310b based on its positional information (e.g., 1) stored in the table, which will result in duplicated data.

Reader 302, partitioner 304, and each writer 308 may be implemented as a separate application thread running on system 300. Each of reader 302, partitioner 304, and writer 308 can alternatively be implemented as hardware components of system 300, such as through ASIC (Application Specific Integrated Circuit). Although not shown, system 300 may include other components.

This disclosure can take the form of an entirely hardware implementation, an entirely software implementation, or an implementation containing both hardware and software elements. In one implementation, this disclosure is implemented in software, which includes, but is not limited to, application software, firmware, resident software, microcode, etc.

Furthermore, this disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Figure 4:
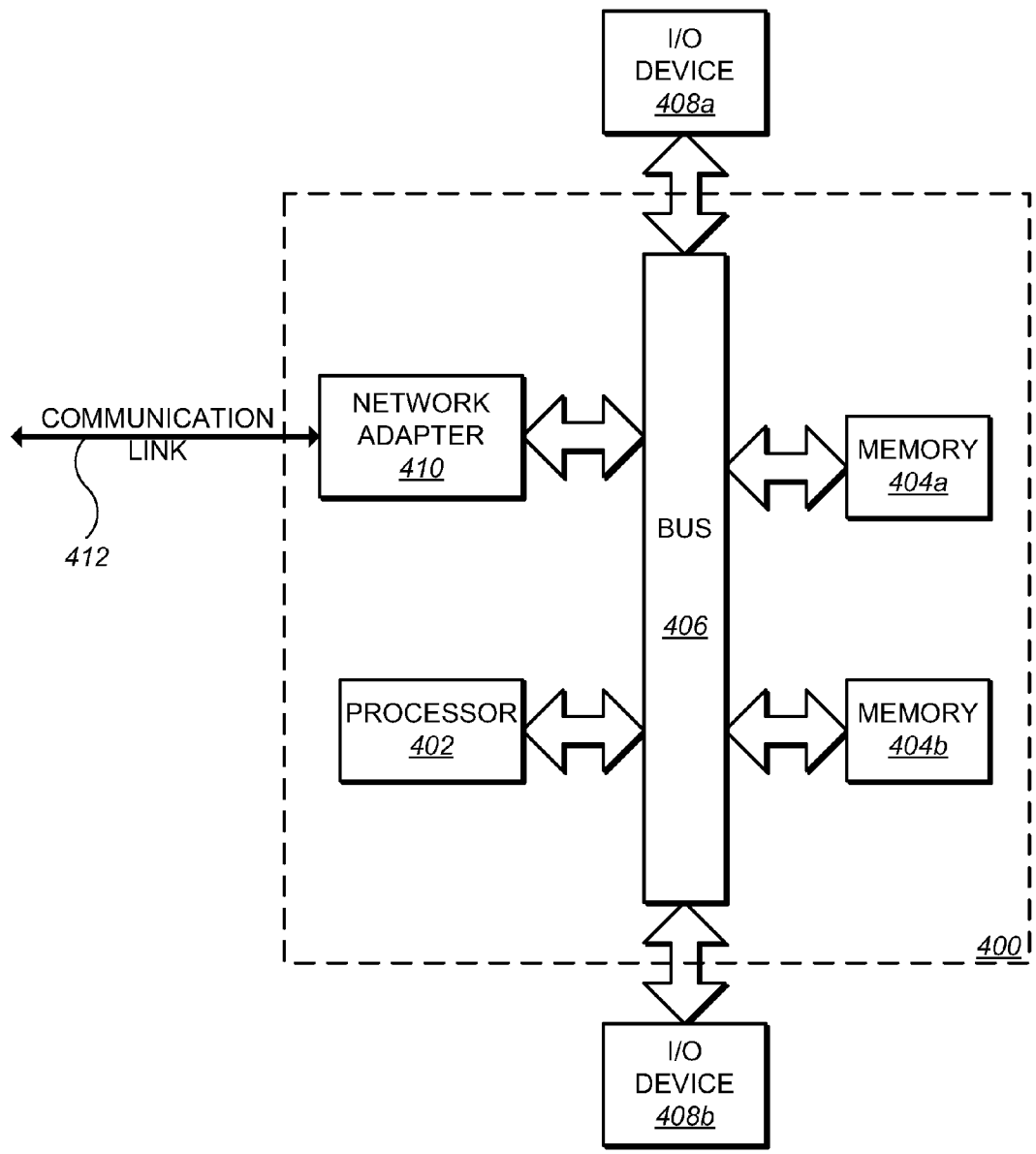
FIG. 4 is a block diagram of a data processing system with which implementations of this disclosure can be implemented.

FIG. 4 depicts a data processing system 400 suitable for storing and/or executing program code. Data processing system 400 includes a processor 402 coupled to memory elements 404a-b through a system bus 406. In other implementations, data processing system 400 may include more than one processor and each processor may be coupled directly or indirectly to one or more memory elements through a system bus.

Memory elements 404a-b can include local memory employed during actual execution of the program code, bulk storage, and cache memories that provide temporary storage of at least some program code in order to reduce the number of times the code must be retrieved from bulk storage during execution. As shown, input/output or I/O devices 408a-b (including, but not limited to, keyboards, displays, pointing devices, etc.) are coupled to data processing system 400. I/O devices 408a-b may be coupled to data processing system 400 directly or indirectly through intervening I/O controllers (not shown).

In the implementation, a network adapter 410 is coupled to data processing system 400 to enable data processing system 400 to become coupled to other data processing systems or remote printers or storage devices through communication link 412. Communication link 412 can be a private or public network. Modems, cable modems, and Ethernet cards are just a few of the currently available types of network adapters.

While various implementations for transferring data from positional data sources to partitioned databases have been described, the technical scope of this disclosure is not limited thereto. For example, this disclosure is described in terms of particular systems having certain components and particular methods having certain steps in a certain order. One of ordinary skill in the art, however, will readily recognize that the methods described herein can, for instance, include additional steps and/or be in a different order, and that the systems described herein can, for instance, include additional or substitute components. Hence, various modifications or improvements can be added to the above implementations and those modifications or improvements fall within the technical scope of this disclosure.

The invention claimed is:

1. A computer-implemented method for transferring data from data sources to database partitions, the method comprising:
    reading a record from a data source in a computer system, the record having a position that uniquely identifies the record in the data source relative to a starting position of the data source, wherein the record is to be written to one of a plurality of partitions of a database in the computer system, wherein the record is one of a plurality of records written to the one partition and the position of the record is farthest from the starting position of the data source among the plurality of records written to the one partition;
    obtaining the position of the record in the data source;
    initiating a transaction to write the record to the one partition and to store the position of the record in the database;
    committing the transaction after the record is successfully written to the one partition and the position of the record is successfully stored in the database; and
    upon a restart following a failure, avoiding writing the record of the committed transaction to the one partition by rejecting any record with a position that is less than or equal to the position of the committed transaction.

2. The method of claim 1, further comprising:
    rolling back the transaction when the record is not successfully written to the one partition or the position of the record is not successfully stored in the database.

3. The method of claim 1, further comprising:
    responsive to a restart after a failure, using the position of the record stored in the database to determine which position in the data source to restart reading a record from the data source.

4. The method of claim 3, wherein both the record and at least one record that is written to a different partition on the database are stored into the database in parallel, and wherein determining which position to restart reading from the data source after the failure further comprises:
    determining whether the position of the record is closer to the starting position of the data source than a position of the at least one record, wherein the position to restart reading from the data source is the closer position.

5. The method of claim 1, wherein the plurality of records are written to the one partition in order and the record is a last of the plurality of records written to the one partition.

6. The method of claim 1, wherein the position of the record is stored in the one partition of the database.

7. The method of claim 1, wherein the data source is a file.

8. A system for transferring data from data sources to database partitions, the system comprising:
 a processor; and
 a data engine executing on the processor, the data engine
  reading a record from a data source, the record having a position that uniquely identifies the record in the data source relative to a starting position of the data source, wherein the record is to be written to one of a plurality of partitions of a database, wherein the record is one of a plurality of records written to the one partition and the position of the record is farthest from the starting position of the data source among the plurality of records written to the one partition,
  obtaining the position of the record in the data source,
  initiating a transaction to write the record to the one partition and to store the position of the record in the database,
  committing the transaction after the record is successfully written to the one partition and the position of the record is successfully stored in the database;
  upon a restart following a failure, avoiding writing the record of the committed transaction to the one partition by rejecting any record with a position that is less than or equal to the position of the committed transaction.

9. The system of claim 8, wherein the data engine further rolls back the transaction when the record is not successfully written to the one partition or the position of the record is not successfully stored in the database.

10. The system of claim 8, wherein responsive to a restart after a failure, the data engine further comprises:
 using the position of the record stored in the database to determine which position in the data source to restart reading a record from the data source.

11. The system of claim 10, wherein both the record and at least one record that is written to a different partition on the database are written into the database in parallel, and wherein determining which position to restart reading from the data source after the failure further comprises:
 determining whether the position of the record is closer to the starting position of the data source than a position of the at least one record, wherein the position to restart reading from the data source is the closer position.

12. The system of claim 8, wherein the plurality of records are written to the one partition in order and the record is a last of the plurality of records written to the one partition.

13. The system of claim 8, wherein the position of the record is stored in the one partition of the database.

14. The system of claim 8, wherein the data source is a file.

15. A computer readable storage medium encoded with a computer program for transferring data from data sources to database partitions,
 wherein the computer program, when executed on a computer, causes the computer to:
  read a record from a data source, the record having a position that uniquely identifies the record in the data source relative to a starting position of the data source,
 wherein the record is to be written to one of a plurality of partitions of a database,
 wherein the record is one of a plurality of records written to the one partition and the position of the record is farthest from a starting position of the data source among the plurality of records written to the one partition;
  obtain the position of the record in the data source;
  initiate a transaction to write the record to the one partition and to store the position of the record in the database;
  commit the transaction after the record is successfully written to the one partition and the position of the record is successfully stored in the database; and
  upon a restart following a failure, avoiding writing the record of the committed transaction to the one partition by rejecting any record with a position that is less than or equal to the position of the committed transaction.

16. The medium of claim 15, wherein the computer program further causes the computer to:
 roll back the transaction when the record is not successfully written to the one partition or the position of the record is not successfully stored in the database.

17. The medium of claim 15, wherein responsive to a restart after a failure, the computer program further causes the computer to:
 use the position of the record stored in the database to determine which position in the data source to restart reading a record from the data source.

18. The medium of claim 15, wherein the plurality of records are written to the one partition in positional order and the record is a last of the plurality of records written to the one partition.

19. The medium of claim 15, wherein the position of the record is stored in the one partition of the database.

* * * * *